Jan. 8, 1963
H. JOYNER
3,071,934
UTILIZING VEHICLE AIR-CONDITIONING SYSTEM
FOR INTERNAL COMBUSTION ENGINE
Filed March 2, 1959
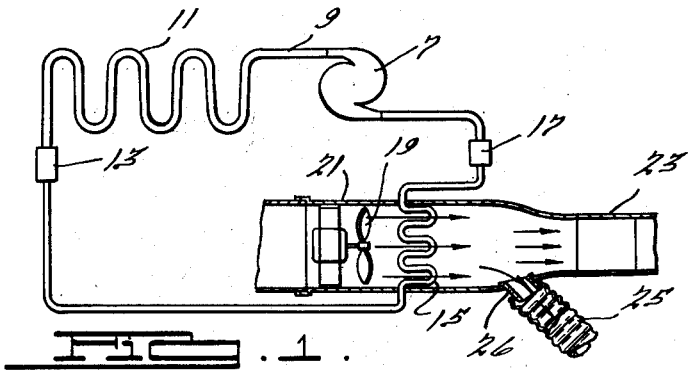
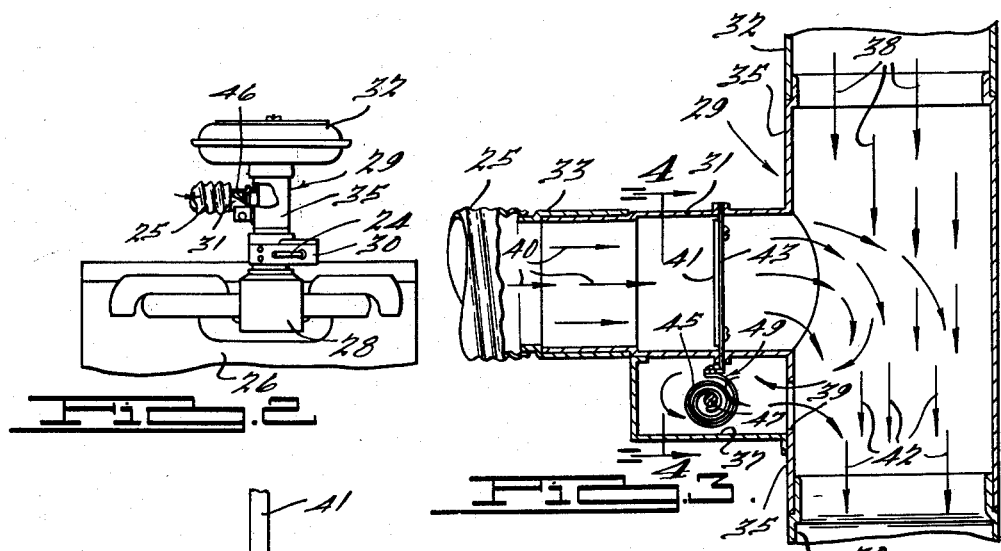
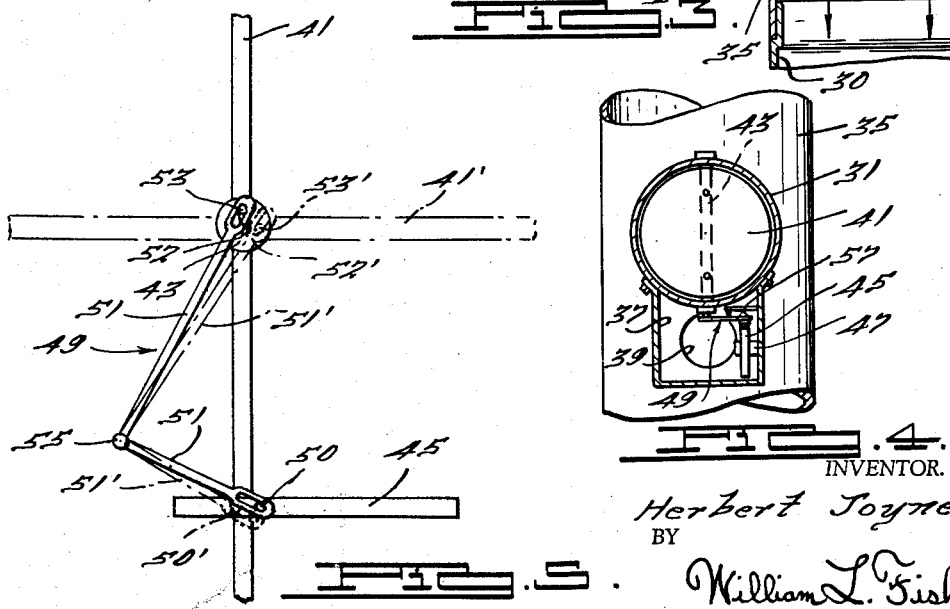
INVENTOR.
Herbert Joyner.
BY
William L. Fisher
ATTORNEY United States Patent Office 3,071,934
Patented Jan. 8, 1963

3,071,934
UTILIZING VEHICLE AIR-CONDITIONING SYSTEM FOR INTERNAL COMBUSTION ENGINE
Herbert Joyner, Detroit, Mich., assignor of one-half to William L. Fisher
Filed Mar. 2, 1959, Ser. No. 796,609
13 Claims. (Cl. 62—89)

This invention relates to novel means and method utilizing the excess capacity of motor vehicle air-conditioning systems, whereby cold-refrigerated air is introduced into the intake air flowing to the carburetor of internal combustion gasoline engines of air-conditioned motor vehicles to maintain the air to gas weight-ratio more closely to its optimum value.

The conventional internal combustion gasoline engine can be considered in a simplified sense as an air pump, the optimum net output of which is dependent upon an optimum net input of air. The weight of air processed through the engine is a function of the temperature and in this sense the temperature factor in the PV/T relationship is the controlling and decisive condition. Assuming any given fuel and compression ratio for an internal combustion gasoline engine there exists an optimum air to gas weight-ratio and hence an optimum temperature for the intake mixture to secure maximum performance from the engine. During seasons of warm weather the air to gasoline weight-ratio is consistently below the optimum ratio and likewise is the intake mixture temperature above the optimum value. The subject invention utilizes conventional air-conditioning systems currently furnished as optional equipment by manufacturers of most motor vehicles and injects under certain operating conditions particularly during seasons of warm weather surplus cold-refrigerated air produced by such systems into the carburetor of the internal combustion engine to mix with the normal intake air stream to produce an increase in the air to gas weight-ratio and such injection is effected as a function of the temperature of the vapor fuel stream which may be the temperature of the air stream passing into the carburetor of the engine or the temperature of the gasoline-air vapor mixture in the intake manifold.

Motor vehicle air-conditioning systems in general are designed with excess capacity to accommodate the more extreme conditions of hot weather but during normal operation produce a surplus of cold-refrigerated air at the expense of engine horsepower. This conversion of engine horsepower absorbs roughly five to eight hp. of normal engine capacity and represents lost power to the wheels. The present invention serves to recapture the bulk of this normally lost power by utilizing a portion of the cold-refrigerated air output of the air-conditioning system for admixture with the normal intake air to maintain a point of operating engine efficiency more closely to maximum.

Briefly, the subject invention comprises in combination with a motor vehicle air-conditioning system and the internal combustion gasoline engine of such vehicle, fluid-conduit means for tapping-off a portion of the cold-refrigerated air output of said air-conditioning system, means introducing said portion into the intake air stream flowing to the carburetor of said engine, valving means regulating the flow of said portion of cold-refrigerated air in said fluid-conduit means, temperature sensing means disposed in the vapor fuel stream flowing to the combustion chambers of the engine, and means responsive to said temperature sensing means controlling said valving means so that the flow of said portion of cold-refrigerated air into said intake air stream is a function of the temperature of said vapor fuel stream. The idea of means and method herein described feeds a proper maximum density charge to the carburetor from a source which said means and method creates out of an already available supply.

In the drawings accompanying this application,
FIG. 1 is a schematic diagram of a conventional motor vehicle air-conditioning system for a closed passenger motor vehicle having incorporated therein a modification in accordance with the present invention;
FIG. 2 is a side elevational view on a reduced scale and with parts broken-away of the principal parts of one embodiment of the present invention shown in combination with conventional pertinent equipment on an internal combustion gasoline engine;
FIG. 3 is an enlarged sectional view of portions of the structure of FIG. 2 illustrative also of the method of the present invention;
FIG. 4 is a vertical sectional view of FIG. 3 taken on the line 4—4 thereof; and
FIG. 5 is an enlarged schematic view in plan of portions of the structure of FIGS. 3 and 4.

Referring to the drawings in greater detail and first to the motor vehicle air-conditioning system shown in FIG. 1, 7 indicated a gas compressor incorporated in a closed circuit of piping 9 circulating a refrigerant such as Freon gas. The operation of this system is entirely conventional but for purposes of clarity will be briefly described as follows. The refrigerant is pumped from the pressure side of the compressor 7 to a condenser coil 11 which is usually disposed near the radiator of the motor vehicle and in the coil 11 the refrigerant is cooled and condensed. Leading from the condenser coil 11 is an expansion valve 13 by which the refrigerant expands through an evaporator coil 15 from which it is conveyed to the intake side of the compressor 7 through a thermostatic control valve 17. A fan 19 mounted in a suitable duct 21 through which the evaporator coil 15 extends, blows atmospheric air around and past the evaporator coil 15, which air is cooled and refrigerated and conveyed through connecting duct 23 to a register (not shown) located in the passenger compartment of the motor vehicle.

My invention in relation to any conventional motor vehicle air-conditioning system such as the one shown and described commences at the exit end of the same where the cold-refrigerated air is produced, which in the usual instance is on the exit side of the evaporator coil as shown in FIG. 1, and includes fluid conduit means which may comprise a flexible conduit, a portion of which is shown in FIG. 1 and indicated at 25. One end of the flexible conduit 25 may be joined to the duct 21 by a smaller offset rigid duct section 26.

The fluid conduit means taps off a portion of the cold-refrigerated air flowing to the passenger compartment of the motor vehicle through the duct 23 and introduces said portion into the normal intake air stream flowing to the carburetor to mix therewith and may further comprise an adapter indicated generally at 29 which is connected with the other end of the flexible conduit 25. The adapter 29 may be readily inserted between the air cleaner and carburetor of an internal combustion engine as shown in FIG. 2 in which the carburetor is indicated at 30 and the air cleaner at 32. The carburetor 30, as is conventional, is joined to the intake manifold 28 which in turn leads to the combustion chambers of the engine within the engine block which is designated by the numeral 26. The gasoline line to the carburetor is indicated at 24. In the embodiment shown, the adapter 29 is in the form of an upended T the offset leg of which, indicated at 31, is joined to the flexible conduit 25 by a suitable pipe section 33 (FIG. 3). The vertical leg of the adapter is indicated at 35 and has its upper end joined to the air cleaner 32 and its lower end joined to the carburetor 30 as shown in FIG. 3. The adapter 29 also includes a chamber 37 disposed below the junction of the two legs and which is sealed from the offset leg 31 but which communicates with the vertical leg 35 below said junction through an opening 39 in the latter. The opening 39 is downstream from the normal flow of atmospheric air indicated by arrows 38, taken in through the air cleaner 32 which after passing around and over the heated engine enters the upper end of the vertical leg 35 and is also downstream from the flow of cold-refrigerated air, indicated by arrows 40, which enters the offset leg 31. In this leg 31 is installed valving means which in the embodiment shown is in the form of a butterfly valve indicated at 41. The valve 41 is vertically disposed and pivotally mounted in the leg 31 by means of a central stem 43 the lower end of which extends through the leg 31 into the chamber 37. The valve 41 is arranged to move between fully open and fully closed positions parallel and perpendicular respectively with the axis of the leg 31 and its movement is controlled by temperature sensing means which is disposed in the chamber 37 so as to be in contact with the downstream mixture of normal atmospheric air and cold-refrigerated air, indicated by arrows 42. In the particular instance shown, the temperature sensing means is in the form of a helical bi-metallic thermostatic element 45. The inner end of the bi-metallic element 45 is fixed and may be mounted on one wall of the chamber 37 as shown in FIG. 4 as by a support pin 47. The outer end of the bi-metallic element 45 is movable and connected to a suitable linkage indicated generally at 49 and shown in greater detail in FIG. 5 to which is also connected the lower end of the stem 43. The linkage 49 translates the movement of the bi-metallic element 45 into corresponding movements of the valve 41. Such linkage may take the form of multiplying levers such as the bent lever 51 shown, one end of which is affixed to the movable end of the bi-metallic element 45 by a pin and slot connection as shown. The pin on the free end of the bi-metallic element is indicated at 50. The other end of the lever 51 is similarly connected to one end of another much shorter lever 52, the pin for which on this end is indicated at 53. The other end of the lever 52 is fixedly secured to the lower end of the stem 43. The lever 51 is pivoted at its bend by a connection indicated at 55 in FIG. 5 which pivot connection may be supplied by a pivot pin mounted on a wall of the chamber 37 as by the support member 57, shown in FIG. 4. The positions of the linkage and related parts shown in heavy outline in FIG. 5 correspond to one extreme position of the movable end of the bi-metallic element 45 in which the valve 41 is in the fully closed position while the positions of the same parts shown in dash lines and indicated by like numerals primed correspond to the other extreme position of the bi-metallic element 45 in which the valve 41 is in the fully open position.

The chamber 37 in which the bi-metallic element 45 and linkage 49 are housed is preferably separable from the leg 31 for adjustment or replacement purposes but it is essential that the bi-metallic element be in contact with the vapor fuel stream such as the mixture air stream 42 flowing in the lower portion of the leg 35. It is important that the temperature sensing means be disposed so as to be capable of sensing the temperature of an accurate sample of the vapor fuel stream flowing to the combustion chambers of the engine which may be accomplished by the arrangement shown since the mixture air in the chamber 37 is sufficiently static for measuring purposes and adequately dynamic for sampling purposes. It should be understood that the temperature sensing means may be in other forms and be otherwise located in relation to the vapor fuel stream such as in the intake manifold for measuring the temperature of the intake gasoline-air vapor mixture flowing to the combustion chambers of the engine after the mixture of cold-refrigerated air and normal atmospheric air heated by passing over the engine are carbureted with gasoline from the conventional source in the carburetor. In such case, the temperature sensing means, when it is expedient to place it in the intake manifold, may be in the form of an extended wire which changes length upon variation in the temperature sensed which change in length can be simply converted into corresponding movements of the valving means.

In operation of the device of the invention an optimum temperature for the vapor fuel stream flowing to the combustion chambers for any given engine is first determined, which can be done simply by anyone skilled in this art. Usually this can be determined from the optimum air to gasoline weight-ratio for the engine which demonstrably is a constant for any given internal combustion engine and fuel and is ordinarily specified, the principal factor being the compression ratio of the engine. Otherwise the engine can be placed on a standard dynamometer test block and an efficiency test run wherein torque versus temperature of intake air mixture curve, or torque versus temperature of intake gasoline-air vapor mixture curve is plotted to locate the temperature at which the maximum torque is developed which is the optimum temperature.

For example, it has been found in this manner that for a Standard Test CFR Engine employing 100 octane gasoline the optimum air to gas weight ratio is approximately 11½ to 1 and that the optimum temperature for the air-gasoline vapor mixture in the intake manifold is approximately 200° F.±10° F. The temperature of the intake air mixture flowing to the carburetor of the engine to maintain the temperature of the gasoline-air vapor mixture in the intake manifold at 200° F. can be readily determined by introducing sufficient cold-refrigerated air into the air steam flowing to the carburetor to produce this temperature of 200° F. in the intake manifold and then measuring the temperature of such intake-air mixture. This temperature will vary with the amount of heat transferred by conduction and/or convection or otherwise from the engine block to the intake manifold and in one instance in the case of the test engine specified has been found to be approximately 140° F.±10° F. The gasoline fuel that is used will have a bearing on the optimum temperature but the variations in the specifications for present day gasoline fuels are minimal enough that the effect on the optimum temperature of changing from one to another is negligible for all practical purposes. That is to say, no adjustment in the operative parts of the subject embodiment would normally be required for changes from one type of gasoline to another. The optimum temperature is independent of the particular air-conditioning system as long as it puts out sufficient cold-refrigerated air to reduce the temperature of the intake fuel stream to near the optimum value and in fact won't vary considerably from engine to engine, as now commercially manufactured, so that in practice a practically fixed temperature for the intake fuel stream can be sought after, and the device set to attain this temperature or near to it.

Once the optimum temperature is determined as mentioned, a temperature range preferably above and below the optimum temperature is selected depending upon the characteristics of the temperature sensing means, the air-conditioning system and the engine, a practical range which can be readily maintained being sufficient to realize the benefits of the subject invention. In fact, it may be that in actual application under certain conditions a temperature range above and below the optimum temperature cannot be maintained in which case a temperature range may be chosen which is above the optimum temperature but as long as it is significantly below the temperature of the normal atmospheric air heated by the engine which would be taken into the carburetor of the engine without employing the means and method herein described nevertheless the advantages of the subject invention will be realized but in diminishing amounts as the temperature actually maintained is removed from the optimum temperature. Also in actual application under certain conditions it may be found desirable to maintain only a maximum temperature, again because of practical limitations some temperature at or above the optimum temperature, instead of a true temperature range in which case the temperature sensing means would be operative to inject cold-refrigerated air into the intake air stream through the valving means only when the temperature of the vapor fuel stream where it is sensed is above a predetermined maximum temperature which is selected to be as close to the optimum temperature as is practicably possible.

Assuming that it is desired to maintain a temperature of 200° F.±10° F. in the intake manifold 28 of the embodiment of the invention shown (which will be found to be the case in practice in most motor vehicle engines) and that to maintain this temperature the intake air mixture 42 flowing to the carburetor 30 must be maintained at 140° F.±10° F., the bi-metallic element 45 is selected so as to be capable of sensing a temperature range of 130° F. to 150° F. and to have its maximum movements between these limits. With the embodiment set up as shown the temperature of the intake air mixture 42 flowing to the carburetor 30 is below 150° F. and the valve 41 is disposed in closed position perpendicular to the axis of the leg 31 preventing ingress of cold-refrigerated air from the conduit 25 to the vertical leg 35. As long as the temperature of the intake air stream 38 doesn't rise the parts will remain in this position but as soon as a sufficient quantity of atmospheric air which has been heated by the engine as it passes over and around it enters the intake air stream 38 to raise the temperature of the intake air mixture 42 as sensed in the chamber 37 above 150° F., the free end of the bi-metallic element 45 will move toward the position 50' shown for the pin 50 thereon in FIG. 5 to actuate the lever 51 to the position shown for it at 51' which moves the lever 52 up to as much as 90° toward the position shown for it at 52' thereby rotating the valve 41 on its stem 42 toward its open position indicated at 41' in FIG. 5 parallel to the axis of the leg 31 to admit cold-refrigerated air from the conduit 25 into the vertical leg 35. Flow of cold-refrigerated air into the leg 35 will continue until the temperature of the intake air mixture 42 as sensed in the chamber 37 falls below 130° F. at which time the bi-metallic element 45 will cause the valve 41 to return toward its closed position through actuation of the linkage 49 in the reverse manner from that described. Once the device has been properly set, this admission and close-off or partial continuous admission as the case may be of cold-refrigerated air from the air-conditioning system via conduit 25 into the leg 35 will be automatically accomplished to reduce the temperature of the intake air mixture flowing to the carburetor and hence increase the air to gasoline weight ratio of the fuel vapor during conditions where this is demanded. Generally this is during seasons of warm weather and also in hot arid areas but even during other seasons including winter the conditions which call for cold-refrigerated air into the carburetor according to the present invention as determined by the temperature sensing element may be present and this is possible when the engine is fully heated and the temperature of the normal atmospheric air is raised above the optimum value from passing around and over the heated engine. The engine burning hot from deposits of sludge, carbon, gum and the like can contribute to these conditions and where the passenger compartment of the motor vehicle does not require air conditioning as in colder weather, nevertheless the air conditioning system may be left in "on" condition to provide a source of cold-refrigerated air in the leg 31 which can be utilized in the manner described as conditions demand. Thus there can be provided an all year long use of a major investment in a motor vehicle accessory as is the air-conditioning plant for the same which normally sits idle approximately one-half of the year in moderate temperature zones in this country.

Among the advantages realized from the subject invention are an increase in the net average useful output of the engine, a decrease in the net average fuel consumption of the engine, a reduction in the amount of carbon, gum and sludge, a recapture of a substantial portion of the hp. expended in operation of the air-conditioning system, elemination of vapor-lock, improvement in the performance of any given motor vehicle as a result of net increase of hp. at the wheels, and the capability of utilizing certain types of gasoline fuels that cannot presently be used because they burn too hot.

It will thus be seen that there has been provided by the present invention a means and method for utilizing excess capacity of motor vehicle air-conditioning systems to increase the efficiency of the internal combustion engine of such vehicles in which thoroughly practicable advantages including those hereinabove set forth are successfully achieved. While a preferred embodiment of the invention has been disclosed it is to be understood that modifications, variations and changes may be resorted to without departing from the spirit of the invention or the scope of the appended claims.

What is claimed is:

1. In a motor vehicle mechanical refrigeration air-conditioning system, the combination functionally and structurally interconnecting the internal combustion engine of said vehicle and said system comprising means for tapping-off a portion of the cold-refrigerated output of said system, and fluid-conduit means introducing said portion into the intake vapor fuel stream flowing to the combustion chambers of the internal combustion engine of said vehicle, said portion being at substantially the same pressure as said intake vapor fuel stream, whereby to increase the air to gasoline weight ratio of the fuel vapor.

2. In a motor vehicle mechanical refrigeration air-conditioning system, the combination functionally and structurally interconnecting the internal combustion engine of said vehicle and said system comprising means for tapping-off a portion of the cold-refrigerated air output of said system, and fluid-conduit means introducing said portion into the intake air stream flowing to the carburetor of the internal combustion engine of said vehicle, said fluid-conduit means being on the upstream side of the carburetor, said portion being at substantially the same pressure as said intake air stream, whereby to increase the air to gasoline weight ratio of the fuel vapor.

3. In a motor vehicle air-conditioning system, the combination functionally and structurally interconnecting the internal combustion engine of said vehicle and said system comprising means for tapping-off a portion of the cold-refrigerated air output of said system, fluid-conduit means introducing said portion into the intake vapor fuel stream flowing to the combustion chambers of the internal combustion engine of said vehicle, valving means regulating the flow of said portion in said fluid conduit means, temperature sensing means disposed in said vapor fuel stream, and means responsive to said temperature sensing means controlling said valving means so that the flow of said portion into said vapor fuel stream is a function of the temperature of said vapor fuel stream whereby to increase the air to gasoline weight ratio of the fuel vapor.

4. In a motor vehicle air-conditioning system, the combination functionally and structurally interconnecting the internal combustion engine of said vehicle and said system comprising means for tapping-off a portion of the cold-refrigerated air output of said system, fluid-conduit means introducing said portion into the intake air stream flowing to the carburetor of the internal combustion engine of said vehicle, said fluid-conduit means being on the upstream side of the carburetor, valving means regulating the flow of said portion in said fluid conduit means, temperature sensing means disposed in said air stream downstream from said valving means, and means responsive to said temperature sensing means controlling said valving means so that the flow of said portion into said air stream is a function of the temperature of said air stream whereby to increase the density of the resultant air stream flowing to the carburetor.

5. In a motor vehicle mechanical refrigeration air-conditioning system, the combination functionally and structurally interconnecting the internal combustion engine of said vehicle and said system comprising means for tapping-off a portion of the cold-refrigerated air output of said system flowing to the passenger compartment of said vehicle, a device on the upstream side of the carburetor of the internal combustion engine of said vehicle conducting the normal flow of atmospheric air toward said carburetor, said tapping-off means including fluid-conduit means introducing said portion into said device, means within said device mixing said portion with said normal flow of atmospheric air flowing through it and means for conducting the mixed resultant air stream to said carburetor, said portion being at substantially the same pressure as said normal flow of atmospheric air, whereby to increase the density of said mixed resultant air steam.

6. In a motor vehicle air-conditioning system, the combination functionally and structurally interconnecting the internal combustion engine of said vehicle and said system comprising means for tapping-off a portion of the cold-refrigerated air output of said system flowing to the passenger compartment of said vehicle, a device on the upstream side of the carburetor of the internal combustion engine of said vehicle conducting the normal flow of atmospheric air toward said carburetor, fluid-conduit means introducing said portion into said device, means within said device mixing said portion with said normal flow of atmospheric air flowing through it, valving means regulating the flow of said portion in said device, temperature sensing means disposed downstream from the place of said mixing so as to sense the temperature of the mixed resultant air stream, and means responsive to said temperature sensing means controlling said valving means so that the flow of said portion in said device is a function of the temperature of the resultant air stream flowing to the carburetor whereby to increase the density of said resultant air stream.

7. In a motor vehicle air-conditioning system, the combination functionally and structurally interconnecting the internal combustion engine of said vehicle and said system comprising means for tapping-off a portion of the cold-refrigerated air output of said system flowing to the passenger compartment of said vehicle including a conduit having one end joined to the output side of said system, an adapter having one leg joined to the other end of said conduit and receiving said portion, said adapter being disposed on the upstream side of the carburetor of the internal combustion engine of said vehicle, another leg on the adapter receiving the normal flow of atmospheric air flowing to said carburetor, means within said adapter mixing said portion with said normal flow of atmospheric air flowing into it, a third leg on the adapter joined to the carburetor conducting the mixed resultant air stream to said carburetor, valving means in said one leg regulating the flow of said portion therethrough, temperature sensing means located downstream from the valving means so as to sense the temperature of the mixed resultant air stream, and means responsive to said temperature sensing means controlling said valving means so that the flow of said portion in said one leg is a function of the temperature of the mixed resultant air stream flowing to the carburetor whereby to increase the density of said resultant air stream.

8. Means utilizing excess capacity of motor vehicle air-conditioning systems to increase the efficiency of the internal combustion engine of such vehicles comprising an adapter having one leg adapted to be joined to the output side of said system and constructed to receive a portion of the cold-refrigerated air output of said system, said adapter having means for joining it to the upstream side of the carburetor of the internal combustion engine of said vehicle, another leg on said adapter constructed to receive the normal flow of atmospheric air flowing to said carburetor, means within said adapter for mixing said portion with said normal flow of atmospheric air, and a third leg on the adapter for conducting the mixed resultant air stream to said carburetor, valving means in said one leg for regulating the flow of said portion therethrough, temperature sensing means located downstream from the valving means so as to sense the temperature of the mixed resultant air stream, and means responsive to said temperature sensing means for controlling said valving means so that the flow of said portion in said one leg will be a function of the temperature of the mixed resultant air stream flowing to the carburetor whereby to increase the efficiency of the internal combustion engine of said vehicle.

9. A method utilizing excess capacity of a motor vehicle mechanical refrigeration air-conditioning system to increase the efficiency of the internal combustion engine of such vehicle comprising tapping off a portion of the cold-refrigerated output of said system, and introducing said portion into the intake vapor fuel stream flowing to the combustion chambers of the internal combustion engine of said vehicle, said portion being at substantially the same pressure as said intake vapor fuel stream, whereby to increase the air to gasoline weight ratio of the fuel vapor.

10. A method utilizing excess capacity of a motor vehicle mechanical refrigeration air-conditioning system to increase the efficiency of the internal combustion engine of such vehicle comprising tapping off a portion of the cold-refrigerated air output of said system, introducing said portion into the intake air stream flowing to the carburetor of the internal combustion engine of said vehicle, mixing said portion with said intake air stream on the upstream side of the carburetor, and conducting the mixed resultant air stream to said carburetor, said portion being at substantially the same pressure as said intake air stream, whereby to increase the air to gasoline weight ratio of the fuel vapor.

11. A method utilizing excess capacity of a motor vehicle air-conditioning system to increase the efficiency of the internal combustion engine of such vehicle comprising tapping-off a portion of the cold-refrigerated air output of said system, introducing said portion into the intake vapor fuel stream flowing to the combustion chambers of the internal combustion engine of said vehicle, mixing said portion with said vapor fuel stream, sensing the temperature of the mixed resultant vapor fuel stream regulating the flow of said portion into said vapor fuel stream as a function of the temperature of said mixed resultant vapor fuel stream and conducting the mixed resultant vapor fuel stream to the combustion chambers of the internal combustion engine of said vehicle whereby to increase the air to gasoline weight ratio of the fuel vapor.

12. A method utilizing excess capacity of a motor vehicle air-conditioning system to increase the efficiency of the internal combustion engine of such vehicle comprising tapping-off a portion of the cold-refrigerated air output of said system, introducing said portion into the intake air stream flowing to the carburetor of the internal combustion engine of said vehicle, mixing said portion with said intake air stream on the upstream side of the carburetor, sensing the temperature of the mixed resultant air stream, regulating the flow of said portion into said intake air stream as a function of the temperature of said mixed resultant air stream, and conducting said mixed resultant air stream to said carburetor whereby to increase the density of said mixed resultant air stream.

13. A method utilizing excess capacity of a motor vehicle air-conditioning system to increase the efficiency of the internal combustion engine of said vehicle comprising tapping-off a portion of the cold-refrigerated air output of said system flowing to the passenger compartment of said vehicle, introducing said portion into the normal flow of atmospheric air flowing toward the carburetor of the internal combustion engine of said vehicle on the upstream side of said carburetor, mixing said portion with said normal flow of atmospheric air, sensing the temperature of the mixed resultant air stream, and controlling the flow of said portion into said normal flow of atmospheric air as a function of the temperature of said mixed resultant air stream in a manner to bring said temperature more closely to its optimum value, and conducting the mixed resultant air stream to said carburetor whereby to increase the density of said mixed resultant air stream.

References Cited in the file of this patent

UNITED STATES PATENTS

| | | |
|---|---|---|
| 2,119,402 | Puffer | May 31, 1938 |
| 2,234,901 | Jones | Mar. 11, 1941 |
| 2,427,284 | Joceylin | Sept. 9, 1947 |
| 2,571,256 | King | Oct. 16, 1951 |
| 2,820,351 | Dolza | Jan. 21, 1958 |
| 2,898,745 | Weisel | Aug. 11, 1959 |